United States Patent
Suvorov et al.

[15] 3,689,491
[45] Sept. 5, 1972

[54] METHOD OF PRODUCING PYRIDINE

[72] Inventors: Boris V. Suvorov, ulitsa Pushkina, 10 2/44, kv. 27; Alfred Davydovich Kagarlitsky, ulitsa Timiryazeva, 71, kv. 44; Iskra Ivanovna Kan, ulitsa Masanchi, 76, kv. 68; Olga Borisovna Lebedeva, 3 mikroraion, 31, kv. 17, all of Alma-Ata, U.S.S.R.

[22] Filed: June 7, 1971

[21] Appl. No.: 150,792

[52] U.S. Cl. ........260/290 R, 260/294.9, 260/295 R, 260/290 P
[51] Int. Cl. .............................................. C07d 31/12
[58] Field of Search .................... 260/290, 294.9, 295

[56] References Cited

UNITED STATES PATENTS 2,845,428   7/1958   Wettstein ................... 260/295

*Primary Examiner*—Henry R. Jiles
*Assistant Examiner*—Harry I. Moatz
*Attorney*—Waters, Roditi, Schwartz & Nissen

[57] ABSTRACT

A method of producing pyridine, comprising vapor-phase oxidation of 2-picoline with oxygen at a temperature of 300°–380° C on oxide vanadium-titanium catalysts at a molar ratio of vanadium pentoxide to titanium dioxide of 1:0.5–16.

The process of oxidation is carried out at a molar ratio of 2-picoline to oxygen, ammonia and water equal to 1:10–60:1–10:40–100 respectively. The resulting oxidation products are entrapped by dissolving them in water. The aqueous ammonia solution of the reaction products is subjected to heat treatment at a temperature of 250°–300° C and a molar ratio of ammonia to said reaction products of at least 0.5 mole of ammonia per mole of the said products, pyridine being thus obtained.

The present method makes it possible to produce pyridine with a yield of up to 87–97 percent as calculated for the 2-picoline used and up to 90–99 percent as calculated for the 2-picoline reacted.

1 Claim, No Drawings

METHOD OF PRODUCING PYRIDINE

The present invention relates to methods of producing pyridine which finds wide application in chemical industry and in the production of pharmaceuticals.

Known in the art is a method of producing pyridine by vapor-phase oxidation of 2-picoline with oxygen over an oxide vanadium-molybdenum catalyst applied onto a nickel-aluminum alloy, in the presence of water vapors.

Considerable quantities of pyridine are also known to be forming in case of vapor-phase oxidation of 2-picoline with oxygen in the presence of ammonia and water vapors at a temperature of 360° C, with the molar ratio of 2-picoline to oxygen, ammonia and water equal to 1:1.8:3.4 respectively, over an oxide vanadium-chromium catalyst on an aluminum oxide carrier.

The disadvantage of the known methods is that they ensure a relatively low yield of the desired product which does not exceed 66.5 percent of the theoretical amount as calculated for the 2-picoline used.

The object of the present invention is to provide a method of producing pyridine which would ensure a higher yield of the desired product.

In accordance with said and other objects the invention consists in carrying out vapor-phase oxidation of 2-picoline in the presence of ammonia and water vapors on mixed vanadium catalysts at a temperature ranging from 300° to 380° C. As said catalysts use is made of oxide vanadium-titanium catalysts with the molar ratio of vanadium pentoxide to titanium dioxide of 1:0.5–16. The process of oxidation is run with 2-picoline, oxygen, ammonia and water being taken in a molar ratio of 1:10–60:1–10:40–100 respectively. The resulting oxidation reaction products which are a mixture of pyridine, and 2-pyridinecarboxamide or a mixture of said compounds with an ammonium salt of 2-pyridinecarboxylic acid are entrapped by dissolving them in water. The aqueous ammonia solution of the reaction products is subjected to heat treatment at a temperature of 250°–300°° C and a molar ratio of ammonia to said reaction products of at least 0.5 mole of ammonia per mole of the said products. As a result of the heat treatment, the ammonium salt of 2-pyridinecarboxylic acid is decarboxylated with the formation of pyridine, and 2-cyanopyridine and 2-pyridinecarboxamide are subjected to hydrolysis to the ammonium salt of 2-pyridinecarboxylic acid, the latter salt being then decarboxylated to pyridine.

The addition of ammonia and water vapors into the oxidation reaction zone contributes to suppression of deep oxidation processes that are accompanied by the destruction of the pyridine ring to such low-molecular compounds as $CO$, $CO_2$ and $HCN$, while favoring the formation of such products of incomplete oxidation as the ammonium salt of 2-pyridinecarboxylic acid, 2-pyridinecarboxamide, 2-cyan-pyridine and pyridine.

The above-specified ratios between 2-picoline, oxygen, ammonia and water make it possible to increase the yield of the incomplete oxidation products with the preserved structure of the pyridine ring up to 90–98 percent.

The running of the oxidation process in the presence of ammonia in such a manner as to ensure a predominant formation of the reaction products with the preserved structure of the pyridine ring and effecting the processes of hydrolysis and decarboxylation to convert nitrogen-containing derivatives of 2-pyridinecarboxylic acid to pyridine result in the yield of pyridine increased to 87–97 percent as calculated for the 2-picoline used and to 90–**percent as calculated for the 2-picoline reacted.

The herein-proposed method of producing pyridine is effected as follows.

A vapor-gas mixture of 2-picoline, molecular oxygen or air, ammonia and water is passed through a through-flow reactor filled with a catalyst whose grains are 3 to 5 mm in size. The rate of feeding the initial 2-picoline, oxygen or air, ammonia and water should be such that the molar ratio of the 2-picoline to the oxygen, ammonia and water would be equal to 1:1 – 60:1 – 10:40 – 100 respectively. The temperature of the oxidation reaction is varied to lie within 300° to 380° C with the time of contact from 0.1 to 1 second. In case the oxidation process is run under milder conditions, that is, at lower temperatures and shorter time of contact, there form such products of incomplete oxidation of 2-picoline as pyridine, 2-cyanopyridine, 2-pyridinecarboxamide and an ammonium salt of 2-pyridinecarboxylic acid. In case the conditions of running the oxidation process are more stringent, that is, the temperatures selected are more elevated and the time of contact is longer, there form all the above-said products with the exception of the ammonium salt of 2-pyridinecarboxylic acid.

Upon leaving the reactor, the vapor-gas mixture of the reaction products is taken to a scrubber sprayed with cold water. The products of incomplete oxidation of 2-picoline with the preserved structure of the pyridine ring are entrapped by being dissolved in water.

The aqueous-ammonia catalyzate and contact gases ($CO$, $CO_2$, $HCN$) are analyzed by using gas chromatography and polarography techniques.

The aqueous-ammonia solution (catalyzate) containing 2-cyanopyridine and 2-pyridinecarboxamide or said products in a mixture with an ammonium salt of 2-pyridinecarboxamide acid, 250°– is subjected to heat treatment in a steel autoclave or a tubular furnace at a temperature of 250–300°C during 1–3 hours. The molar ratio of ammonia to the nitrogen-containing derivatives of 2-pyridinecarboxylic acid should be at least 0.5 mole of ammonia per mole of said products. In case the amount of ammonia proves to be less than required, the necessary quantity thereof is added to the solution in the form of a 25 percent solution of $NH_4OH$. In the course of the heat treatment of the aqueous-ammonia solution the ammonium salt of 2-pyridinecarboxylic acid is decarboxylated with the formation of pyridine and 2-pyridinecarboxamide and 2-cyanopyridine are hydrolyzed with subsequent decarboxylation to pyridine.

For a better understanding of the present invention, the herein-proposed method of producing pyridine is illustrated by the following examples.

EXAMPLE 1

Contact oxidation of 2-picoline is carried out in a through-flow reactor equipped with one reaction tube made of stainless steel, 22 mm in diameter and 1,200 mm long. The tube is filled with 138 ml of a granular catalyst consisting of vanadium pentoxide and titanium dioxide taken in a molar ratio of 1:0.5. A vapor-gas mixture of 2-picoline, water, ammonia and air is passed through the reaction tube which is heated to 300° C. The components are fed at the following rate: 2-picoline, 10 g/hr; ammonia, 7.3 g/hr; air, 650 l/hr; water, 78 g/hr. The time of contact is 0.3 seconds. The experiment lasts for 10 hours. The reaction products are entrapped in scrubbers sprayed with cold water. On completion of the experiment the contents of the scrubbers are analyzed by using gas chromatography and polarography techniques. Found in the catalyzate: 19.7 (23.5 percent) of pyridine, 66.6 g (59.5 percent) of 2-cyanopyridine, 3.3 g (7.5 percent) of 2-pyridinecarboxamide, 9.8 g (2.5 percent) of 2-pyridinecarboxylic acid and 0.6 g (6 percent) of 2-picoline.

The aqueous ammonia solution of said compounds is subjected to heat treatment in a steel autoclave. The amount of the catalyzate per charge is 50 ml. At a temperature of 250° C the experiment lasts for 3 hours. After the extraction of the reaction liquid with chloroform and rectification thereof 77.5 g of pyridine are isolated (boiling point, 115° C; $n_{20D} = 1.500$), which amounts to 87.0 percent as calculated for the 2-picoline fed and to 92.5 percent as calculated for the 2-picoline reacted.

EXAMPLE 2

The reaction of contact oxidation of 2-picoline is carried out in the equipment as described in Example 1. The catalyst is a mixture of vanadium pentoxide and titanium dioxide taken in a molar ratio of 1:8. The reaction temperature is 360° C. The rate of feed is as follows: 2-picoline, 7.85 g/hr; ammonia, 1.8 l/hr; air, 300 l/hr; water, 74.5 g/hr. The time of contact is 0.6 seconds. The experiment lasts for 10 hours. The reaction products are entrapped and analyzed as described in Example 1. Found in the catalyzate: 21.5 g (36.0 percent) of pyridine, 42.4 g (48.0 percent) of 2-cyanopyridine, 5.1 g (5.0 percent) of 2-pyridinecarboxamide and 6.28 g (8.0 percent) of 2-picoline.

After adding 10 ml of a 25 percent solution of ammonia to the catalyzate, the latter is subjected to heat treatment in the apparatus described in Example 1. The temperature of the reaction is 260° C and its duration is 2.5 hours.

After azeotropic distillation and rectification 57.6 g of pyridine (boiling point, 114 5° C; $n^{20}_D = 1.505$) are isolated, this being 87.3 percent as calculated for the 2-picoline fed and 95.6 percent as calculated for the 2-picoline reacted.

EXAMPLE 3

The reaction of contact oxidation of 2-picoline is carried out in the apparatus described in Example 1. The catalyst is a mixture of vanadium pentoxide and titanium dioxide taken in a molar ratio of 1:16. The rate of feed of 2-picoline is 5.5 g/hr; water, ammonia and oxygen (air oxygen) are taken in a ratio of 40–100, 1–10 and 10–60 moles per mole of 2-picoline respectively. The reaction temperature is varied within 330° to 380° C, the time of contact is within 0.13 to 0.75 seconds.

The reaction products are entrapped and analyzed as described in Example 1.

The heat treatment of the catalyzate is effected on a continuous-action installation which is a tubular furnace, the tube thereof being 8,600 mm long and 12 mm in diameter. With the reaction temperature of 250° C the experiment lasts for 3 hours, at 270° C it lasts for 2 hours and at 300° C, for hour.

Pyridine is isolated from the reaction liquid by salting out with potash with subsequent rectification.

The conditions of oxidizing 2-picoline, composition of the oxidation products and yield of pyridine after the heat treatment of the nitrogen-containing derivatives of 2-pyridinecarboxylic acid are given in the following table.

TABLE

| Conditions of contact oxidation of 2-picoline in the presence of ammonia | | | Composition of oxidation products of 2-picoline (in percent) as calculated for the 2-picoline fed | | | | | | Yield of pyridine after heat treatment of catalyzate | |
|---|---|---|---|---|---|---|---|---|---|---|
| 1 | 2 | 3 | 4 | 5 | 6 | 7 | 8 | 9 | 10 | 11 |
| Reaction temperature, ° C. | Molar ratio of 2-picoline, oxygen, ammonia and water | Time of contact, sec. | 2-picoline | 2-pyridinecarboxylic acid | 2-pyridinecarboxamide | 2-cyanopyridine | Pyridine | Deep oxidation products ($CO+CO_2+HCN$) | As calculated for the 2-picoline used, percent | As calculated for the 2-picoline reacted, percent |
| 330 | 1:36:4.5:40 | 0.53 | 2.5 | 3.0 | 6.0 | 47.5 | 41.0 | | 96.0 | 98.5 |
| 340 | 1:10:2:100 | 0.70 | 3.0 | 3.0 | 9.0 | 16.0 | 65.0 | 2.0 | 95.5 | 98.5 |
| 345 | 1:36:4:45 | 0.34 | 6.0 | 2.5 | 5.5 | 42.5 | 41.0 | 2.0 | 90.5 | 96.3 |
| 350 | 1:55:1:60 | 0.25 | 3.5 | 2.5 | 5.0 | 61.5 | 27.5 | | 95.1 | 98.6 |
| 355 | 1:60:1:50 | 0.28 | 3.0 | 4.0 | 8.0 | 54.0 | 24.5 | 6.0 | 89.0 | 92.2 |
| 345 | 1:55:4:55 | 0.39 | 7.0 | 2.0 | 4.0 | 45.0 | 36.6 | 0.5 | 90.5 | 97.6 |
| 340 | 1:60:8:40 | 0.39 | 1.5 | 3.0 | 8.0 | 50.0 | 37.0 | 0.3 | 96.5 | 98.3 |
| 340 | 1:20:10:45 | 0.23 | 2.0 | 2.5 | 10.0 | 59.3 | 25.2 | 1.0 | 96.2 | 98.1 |
| 330 | 1:15:2:60 | 0.34 | 1.6 | 2.5 | 8.8 | 52.5 | 32.5 | 2.1 | 94.0 | 94.5 |
| 365 | 1:16:4.5:100 | 0.48 | 3.0 | 2.0 | 6.6 | 37.0 | 47.0 | 2.5 | 91.2 | 95.8 |
| 350 | 1:36:4:40 | 0.58 | 2.0 | 1.5 | 3.5 | 45.0 | 43.0 | 3.0 | 91.5 | 94.5 |
| 380 | 1:15:4.5:90 | 0.58 | | | 4.0 | 40.2 | 50.0 | 5.0 | 93.0 | 93.0 |
| 375 | 1:55:6:80 | 0.39 | | 2.0 | 8.0 | 45.0 | 43.0 | 2.0 | 96.9 | 96.9 |

What is claimed is:

1. A method of producing pyridine, comprising vapor-phase oxidation of 2-picoline with oxygen at a temperature of 300°–380° C on oxide vanadium-titanium catalysts at a molar ratio of vanadium pentoxide to titanium dioxide of 1:0.5–16 in the presence of ammonia and water vapors at a molar ratio of 2-picoline to oxygen, ammonia and water equal to 1:10 – 60:1 – 10:40 – 100 respectively; entrapment of the resulting oxidation products which are mixtures of compounds selected from the group consisting of a mixture of pyridine, 2-cyanopyridine and 2-pyridinecarboxamide and a mixture of pyridine, 2-cyanopyridine, 2-pyridinecarbox amide and an ammonium salt of 2-pyridinecarboxylic acid, by dissolving said oxidation reaction products in water; subjecting the aqueous-ammonia solution of the reaction products to heat treatment at a temperature of 250°–300° C and at a molar ratio of ammonia to said reaction products of at least 0.5 mole of ammonia per mole of the said products, the ammonium salt of 2-pyridinecarboxylic acid being decarboxylated with the formation of pyridine and 2-cyanopyridine and 2-pyridinecarboxamide being hydrolyzed to the ammonium salt of 2-pyridinecarboxylic acid with subsequent decarboxylation of said salt to pyridine.

* * * * *